United States Patent [19]

Hu

[11] Patent Number: 4,778,125

[45] Date of Patent: Oct. 18, 1988

[54] EXTENSION CORD WINDING DEVICE

[76] Inventor: Dye-Chung Hu, No. 172, Hsin-Hsing Rd., Tung-Jung Li, Pei-Tun District, Taichung City, Taiwan

[21] Appl. No.: 72,017

[22] Filed: Jul. 10, 1987

[51] Int. Cl.$^4$ ............................................. B65H 75/34
[52] U.S. Cl. ..................................... 242/85.1; 242/96; 191/12.2 R
[58] Field of Search .................. 242/85.1, 85, 96, 100, 242/100.1; 191/12 R, 12.2 R, 12.4

[56] References Cited

U.S. PATENT DOCUMENTS

| | | | |
|---|---|---|---|
| 3,227,392 | 1/1966 | Stahmer | 242/85 |
| 3,290,453 | 12/1966 | Jensen | 242/85.1 X |
| 4,095,871 | 6/1978 | Holte | 242/85.1 X |
| 4,193,563 | 3/1980 | Vitale | 242/85 |

FOREIGN PATENT DOCUMENTS 2157263 10/1985 United Kingdom ............... 242/85.1

*Primary Examiner*—John M. Jillions
*Attorney, Agent, or Firm*—Birch, Stewart, Kolasch & Birch

[57] ABSTRACT

An extension cord winding device includes: a frame body integrally formed with an upper frame and a lower frame; an extension cord having a plug at one end and a terminal socket at the other end uniformly wound around the upper frame; and a relay socket electrically connected at a middle place of the extension cord. The upper frame includes: a relay-socket supporting seat fixed on a top surface; a plurality of corrugated positioning grooves, together with a plurality of cord grips, which are located at each side of the upper frame; and a terminal-socket receiving chamber located at an end portion. The lower frame includes a plurality of cord holding members provided on each side, a plurality of supporting struts integrally formed at four corners, and a plurality of stabilizing angle plates movably connected to the supporting struts. The extension cords can thereby be used for making either a longer or a shorter electrical connection without becoming loosened or tangled, and the frame body can be conveniently hooked on an object or placed on a ground surface.

3 Claims, 3 Drawing Sheets

EXTENSION CORD WINDING DEVICE

BACKGROUND OF THE INVENTION

This invention relates to a winding device, and more particularly to an extension cord winding device having a structure suitable for being hooked over an object or placed on a ground surface, and including conductive means with the capacity to assume different lengths for making required electrical connections and cord gripping and holding arrangement designed to prevent the extension cords from becoming loosened or tangled.

DESCRIPTION OF THE BACKGROUND ART

Conventionally, extension cord winding devices usually include a rotary wheel around which an extension cord is wound. These kind of winding devices have their utility in winding and unwinding the extension cord, but they suffer the following problems:

(1) The extension cord provided for the known winding devices normally includes a plug at one end and one or more sockets at the other end. Therefore, no matter how long the extension cord is required for making an electrical connection, electrical current still must flow through the entire length of the extension cord. This condition is undesirable especially when a nearby electrical connection is required, because the electrical current flowing through the remaining wound cord will produce heat which can result in a dangerous condition, such as an electrical fire or development of a short circuit.

(2) Since there is no cord-holding arrangement installed in the known winding devices at various positions thereof, when a portion of the extension cord is pulled out to make an extended connection, the remaining portion of the extension cord may easily unwind itself, causing the cord to become tangled and difficult to rewind.

(3) Since the known winding devices are generally bulky and heavy in structure, they must be placed on the ground, posing certain inconvenience in the area they are used.

(4) As the known winding devices have not been provided with a cord positioning arrangement, cord winding is not evenly made around the rotary wheel. After they are used for some time, winding and rewinding operations often become difficult.

SUMMARY OF THE INVENTION

It is accordingly a primary object of the present invention to provide an extension cord winding device with conductive means of different lengths wherein a terminal socket arranged at the terminal end of an extension cord is used for making a longer electrical connection, and a relay socket is electrically tapped at a middle position of the extension cord, suitable for making a shorter electrical connection.

It is another object of the invention to provide an extension cord winding device having a plurality of cord grips separately installed thereon, so that when any portion of the extension cord is used, the cord grips will properly restrain the remaining part of the cord from unwinding so as to prevent tangling and effect convenient use.

It is a further object of the invention to provide an extension cord winding device having a plurality of supporting members respectively arranged thereon, so that the user may either hang the winding device on an object such as a pipe, the cross beam of a ceiling, etc., or placed it on any surface or the ground so as to avoid undue restriction in the area.

It is still another object of the invention to provide an extension cord winding device having a cord positioning configuration arranged thereon so that the extension cord can be uniformly wound around the winding device for convenient use without incurring a tangled condition.

These and other objects of the invention are achieved by providing an extension cord winding device which comprises a frame body integrally formed with an upper frame and a lower frame, and conductive means composed of an extension cord with a relay socket uniformly wound around the frame body. The upper frame includes a plurality of corrugated positioning grooves, together with a plurality of cord grips, separately located on the opposing ends thereof for keeping the extension cord in uniform position, a terminal-socket receiving chamber formed therein for receiving the terminal socket, and a relay socket supporting seat provided on one side for accommodating the relay socket. The lower frame comprises a plurality of notches separately located in the opposing sides thereof, a plurality of cord holding members respectively fixed in each one of the notches for holding the extension cord in position, a plurality of curved supporting struts integrally formed on each corner of the lower frame for use in hanging the frame body on an object, a plurality of stablizing angle plates movably secured to each one of the curved supporting struts for use in supporting the frame body on a ground surface, and a hand grip integrally formed on a side. Thereby, the extension cord winding device can be conveniently used for making either long or short electrical extension connections in any area while restraining the cord from becoming loosened or tangled.

Other advantages and salient features of the invention will become apparent from a detailed description of a preferred embodiment when read in conjunction with the accompanying drawings. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENT

Figure 1:
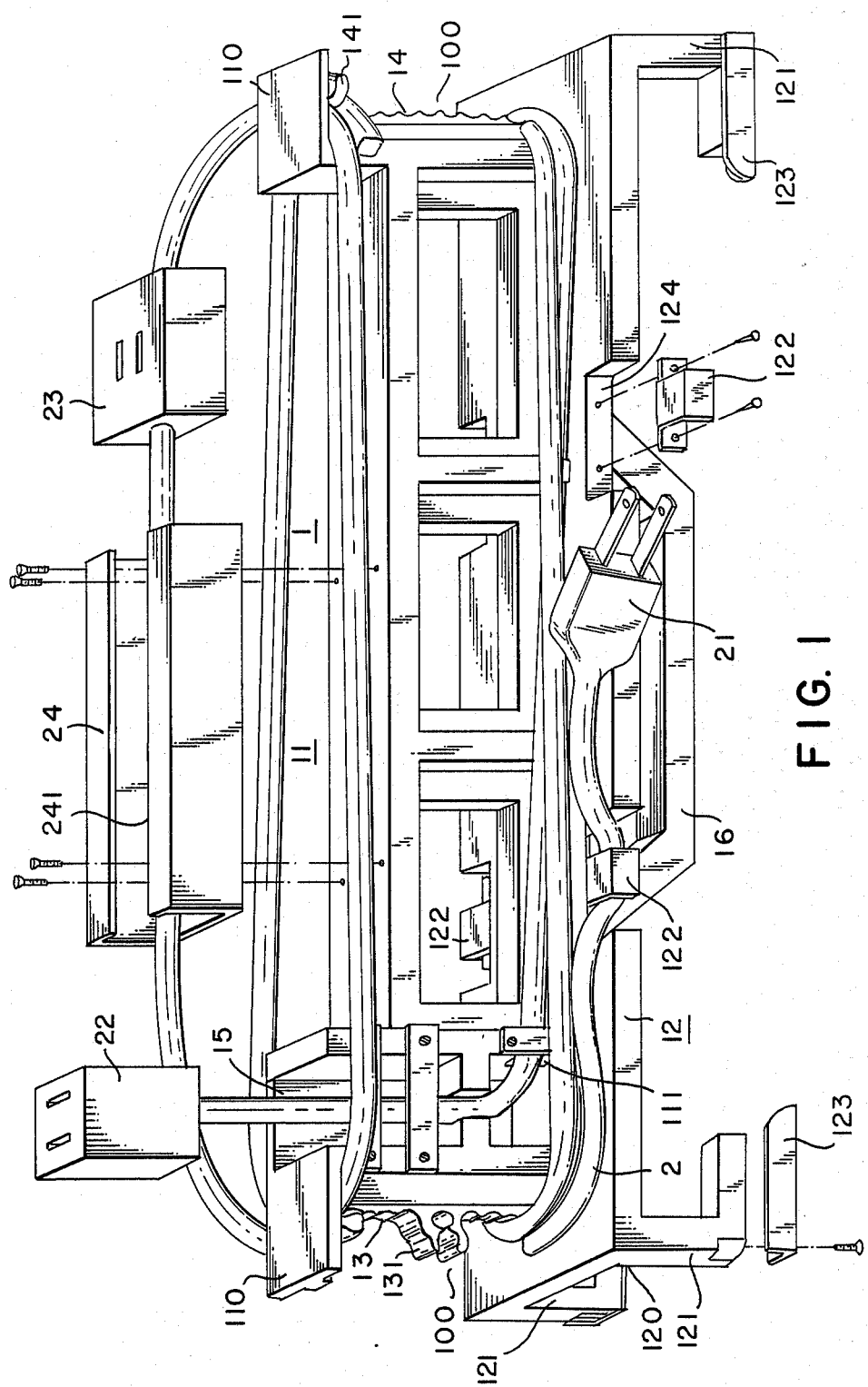
FIG. 1 is an exploded and perspective view of a preferred embodiment of an extension cord winding device according to the present invention.
Figure 2:
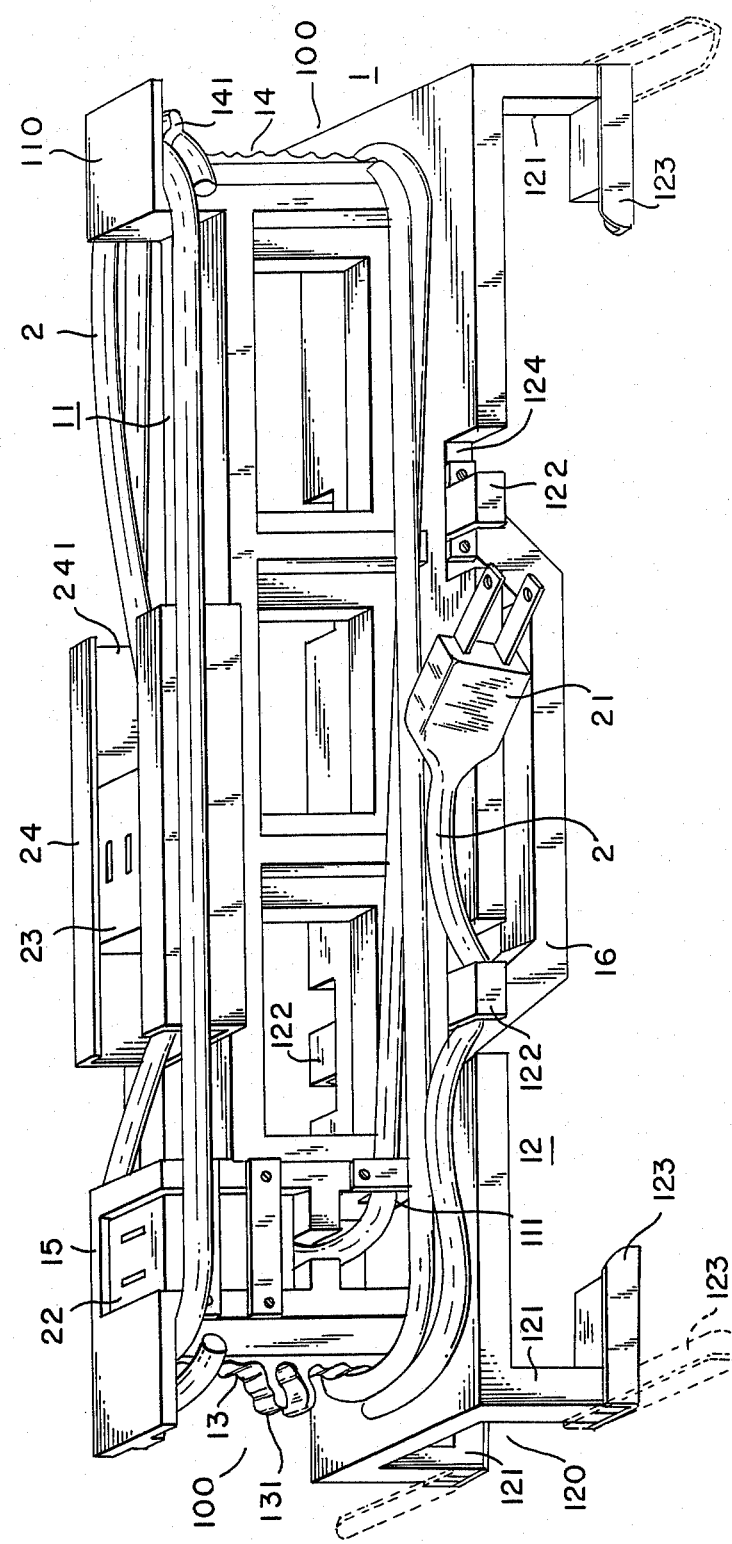
FIG. 2 is a perspective view of the assembled preferred embodiment shown in FIG. 1.
Figure 3:
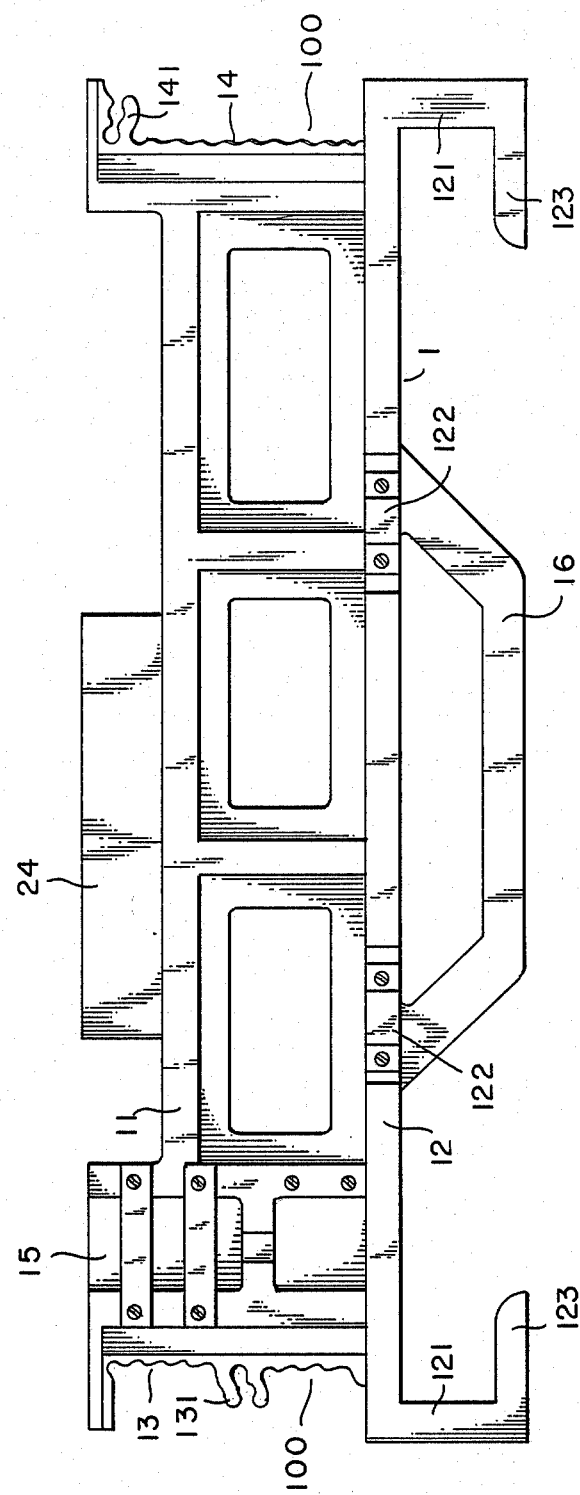
FIG. 3 is a side plan view of the preferred embodiment of FIG. 1.

Referring to FIGS. 1 and 2, the preferred embodiment of an extension-cord winding device according to the present invention comprises a frame body 1 integrally formed with an upper frame 11 and a lower frame 12, and conductive means composed of an extension cord 2 with a plug 21 fixed at one end and a terminal socket 22 at another end. This cord 2 is uniformly wound around the frame body 1 for making a longer electrical connection, and a relay socket 23 electrically connected to a middle place of the extension cord 2 for making a shorter electrical connection. The upper frame 11 includes: a pair of holding flanges 110 separately formed at the upper opposing ends; a plurality of corrugated positioning grooves 13, 14 vertically formed at each side in opposite direction below the holding flanges 110 for keeping the extension cord 2 in uniform position within a space 100 defined at each end by the holding flanges 110 and the lower frame 12 (it shall be appreciated that the extension cord 2 shown in FIGS. 1 and 2 is continuously wound around the frame body 1 within the space 100); a plurality of cord grips 131, 141 (two, for example) respectively formed at each side among the corrugated positioning grooves 13, 14 for holding the unreleased portion of the extension cord therein; a terminal-socket receiving chamber 15 provided at an end portion in conjunction with the terminal socket 22; a relay-socket receiving seat 24 having an open section 241 horizontally formed therein fixed on top of the upper frame 11 for movably accommodating the relay socket 23; and a cord trough 111 formed in the bottom side in communication with the terminal socket receiving chamber 15 for accommodating a portion of the extension cord 2. The lower frame 12 includes: a plurality of curved supporting struts 12 (two, for example) integrally formed at four corners of the lower frame 12 and defining a lower open space 120 in the bottom side thereof for facilitating the frame body 1 to be hooked on an object such as a pipe, a cross beam on a ceiling, etc., or to be placed on a ground surface; a plurality of angle plates 123 (four, for example) movably connected to the curved supporting struts 121 at the curved end thereof for being stretched out to stabilize the frame body 1 in a standing position, as shown in FIG. 2, when it is placed on a ground surface; a plurality of cord holding members 122 (four, for example) separately fixed in a plurality of notches 124 (as four for example) integrally formed along the edge of the lower frame 12 for holding the unreleased cord 2 in position; and a hand grip 16 provided on a bottom side of the lower frame 2 for facilitating manual operation.

As shown in FIG. 2, when the extension cord winding device 1 is not in use, the extension cord 2 is evenly wound around the upper frame 11 through the corrugated positioning grooves 13, 14 with the terminal socket 22 firmly contained in the terminal-socket receiving chamber 15, and the front portion of the main extension cord 2, together with the plug 21, properly held in one of the cord holding members 122 so that no loose or tangling condition will occur. In making a shorter electrical extension connection, just the relay socket 23 is used for output and the extension cord 2 is disconnected at the plug portion from the cord holding member 122. The plug 21 is then connected to the power source such as a wall socket and the main extension cord 2 is released to the required length and the unreleased portion of the main extension cord 2 is held in either one of the cord grips 131, 141 or in one of the cord holding members 122 so as to keep the remaining extension cord 2 in a secured position without incurring a loosening or tangling condition. For longer electrical extension connection, the terminal socket 22 is used for output and the relay socket 23 can be pulled out of the open section 241 of the relay socket receiving seat 24 by releasing the remaining portion of the extension cord 2 as the situation requires. The released end of the extension cord 2 can then be conveniently secured in one of the cord holding members 122 on the lower frame 12 so as to prevent the cord from becoming loosened.

While a preferred embodiment has been illustrated and described, it will be apparent that many changes may be made in the general construction and arrangemnt of the invention without departing from the spirit and scope thereof, and it is therefore desired that the invention not be limited to the exact disclosure but only to the extent of the appended claims.

What is claimed is:

1. An extension cord winding device comprising:
   a frame body integrally formed with an upper frame and a lower frame and adapted to be either hung on an object or placed on a ground surface;
   conductive means including an extension cord uniformly wound around said frame body, said extension cord having an electrical connector at one end for being detachably connected to a power source, and a terminal socket at the other end for providing a longer electrical connection therewith, and having a relay socket electrically connected at a substantially middle portion of said extension cord for providing a shorter electrical connection therewith;
   a relay-socket receiving seat with an open section formed in conjunction with the relay socket horizontally fixed on a top surface of said upper frame for movably accommodating the relay socket; and
   a plurality of cord holding members separately provided in respective notches formed on each side of said lower frame and facing in opposite directions of said lower frame for detachably securing the extension cord; whereby, either a longer or a shorter electrical extension connection can be conveniently made without allowing the extension cord to become loosened or tangled.

2. The extension cord winding device according to claim 1 wherein said upper frame comprises a pair of holding flanges separately formed at each upper end, said plurality of cord holding members comprises a plurality of corrugated positioning grooves vertically provided at each end of said upper frame and facing in opposite directions, said plurality of positioning grooves being positioned under said holding flanges for keeping said extension cord in uniform position after winding, said plurality of cord holding members further comprises a plurality of cord grips separately located at each end of said upper frame among said corrugated positioning grooves for detachably securing the unreleased portion of a main portion and a subsidiary portion of said extension cord therein, a terminal-socket receiving chamber located at an end portion of said upper frame for firmly securing the terminal socket therein, and a cord trough formed in a bottom side of said upper frame and in communication with said terminal-socket receiving chamber for accommodating a portion of said extension cord therein.

3. The extension cord winding device according to claim 1 wherein said lower frame has at least four corners and said lower frame comprises a plurality of curved supporting struts integrally formed at said at least four corners defining an open section under said lower frame for facilitating said frame body to be hooked on an object, a plurality of stabilizing angle plates movably connected to said curved supporting struts for being stretched out to stabilize said frame body in a standing position on a ground surface, and a hand grip formed on a bottom side of said lower frame within the open section.

* * * * *